Feb. 10, 1931. J. JACOBS 1,792,466
MAN'S GARTER
Filed April 30, 1930
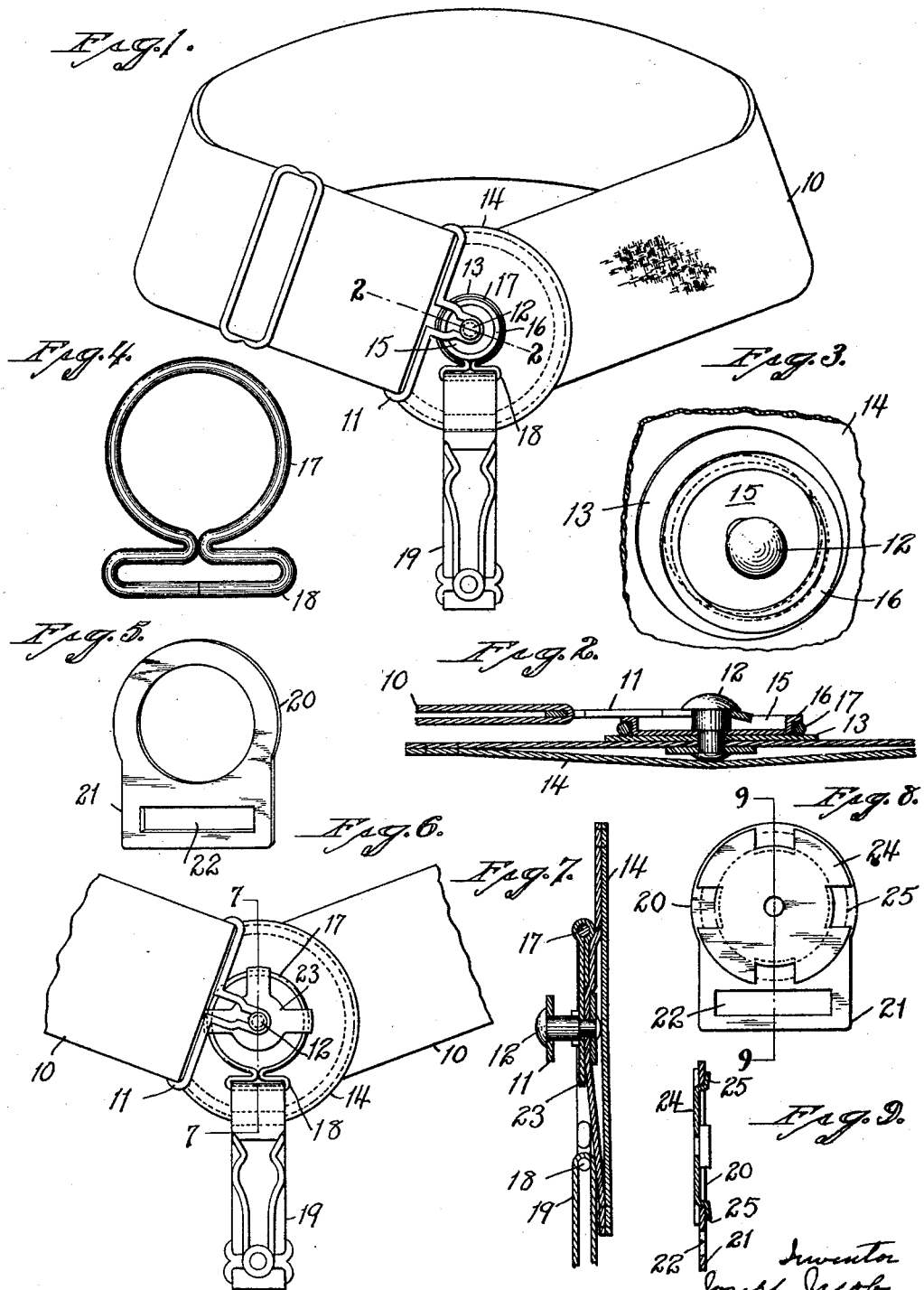

Patented Feb. 10, 1931

1,792,466

UNITED STATES PATENT OFFICE

JOSEPH JACOBS, OF BRIDGEPORT, CONNECTICUT, ASSIGNOR TO THE A. J. DONAHUE CORPORATION, OF MILFORD, CONNECTICUT, A CORPORATION

MAN'S GARTER

Application filed April 30, 1930. Serial No. 448,538.

This invention relates to an improvement in men's garters and particularly to garters which are adapted for use on either leg, the object being to form a garter with means for rotatably connecting the button-and-loop member with the garter-strap so that it may freely turn thereon without imposing wear upon the webbing supporting the button-and-loop member.

The invention consists in the construction as hereinafter described and particularly recited in the claims.

In the accompanying drawings:

Fig. 1 is a face view of a garter constructed in accordance with my invention;

Fig. 2 is a sectional view taken on the line 2—2 of Fig. 1;

Fig. 3 is a perspective view showing means for mounting the ring;

Fig. 4 is a face view of the ring-support detached;

Fig. 5 is a perspective view of a modified means for mounting the ring;

Fig. 6 is a broken front view illustrating modified means for mounting the ring;

Fig. 7 is a sectional view taken on the line 7—7 of Fig. 6;

Fig. 8 is a front view illustrating another modified form of mounting in the ring; and Fig. 9 is a sectional view taken on the line 9—9 of Fig. 8.

In carrying out my invention, I employ the usual garter-strap 10 provided at one end with an eye 11 to engage with a stud 12 at the other end of the webbing.

In the preferred form of my invention, I employ a plate 13 which is attached to the center of a pad 14 secured to one end of the garter-strap, and superimposed upon the plate 13 is a disk 15 having its edge 16 offset so as to provide space between the disk and plate for a ring 17 and this ring is formed with a loop 18 from which the button-and-loop member 19 is suspended, so that the button-and-loop member may be turned for use on one leg or the other. The plate and disk are secured in position by the stud 12 before referred to.

It is obvious and as shown in Fig. 5 of the drawings that instead of forming the ring from wire, a ring 20 may be formed from sheet-metal with an extension 21 having a slot 22; or instead of securing the ring between a plate and a disk, it may be supported by a spider-like plate 23, the ends of which are folded around the ring 17 and so as to rotatably mount the ring as shown in Figs. 6 and 7 of the drawings; or if the ring is made from sheet-metal, as shown in Fig. 5 of the drawings, it may be mounted on a disk 24 which is formed at intervals with inwardly-offset fingers 25 which will interlock the ring with the disk to permit rotation relative thereto. In either case, the ring is firmly mounted and adapted for rotation.

I claim:

1. A garter comprising a strap, two plates mounted at one end thereof, the edge of the outer plate offset and a ring mounted between said plates beneath said offset, a button-and-loop member connected with said ring, a stud concentric with said ring, and means for connecting the other end of the strap therewith.

2. In a garter, the combination with a garter-strap of a plate secured thereto, the edge of said plate offset and a ring held in place by said offset, a button-and-loop member suspended from said ring, and a stud concentric with the ring and means for connecting the other end of the strap therewith.

In testimony whereof I have signed this specification.

JOSEPH JACOBS.